United States Patent
Kamioka et al.

(10) Patent No.: US 8,380,410 B2
(45) Date of Patent: Feb. 19, 2013

(54) CLUTCH CONTROL DEVICE

(75) Inventors: Nozomu Kamioka, Chiyoda-ku (JP); Yasufumi Ogawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1001 days.

(21) Appl. No.: 12/411,158

(22) Filed: Mar. 25, 2009

(65) Prior Publication Data

US 2010/0087294 A1    Apr. 8, 2010

(30) Foreign Application Priority Data

Oct. 7, 2008    (JP) ................. 2008-260736

(51) Int. Cl.
*G06F 7/00* (2006.01)
*G06F 17/00* (2006.01)
*G06F 19/00* (2011.01)
*B60W 10/02* (2006.01)
*B60W 10/04* (2006.01)

(52) U.S. Cl. .................. 701/67; 477/176; 477/179

(58) Field of Classification Search .............. 475/43, 475/65, 67, 116, 118, 119, 125, 238, 269, 475/293; 477/70, 83–84, 166, 174, 175, 477/178–181; 701/41, 51, 66–68; 192/84.6; 318/3–15, 161–164, 400.01, 400.17, 400.42, 318/700

See application file for complete search history.

(56) References Cited

U.S. PATENT DOCUMENTS

| | | | | |
|---|---|---|---|---|
| 4,834,226 A | * | 5/1989 | Ohkumo et al. | 477/87 |
| 5,602,735 A | * | 2/1997 | Wada | 701/41 |
| 6,296,593 B1 | * | 10/2001 | Gotou et al. | 477/176 |
| 6,694,237 B2 | * | 2/2004 | Kifuku et al. | 701/41 |
| 2009/0137362 A1 | * | 5/2009 | Yonezawa et al. | 477/5 |

FOREIGN PATENT DOCUMENTS

| | | |
|---|---|---|
| JP | 2002-81472 A | 3/2002 |
| JP | 2003-264990 A | 9/2003 |
| JP | 2006-6037 A | 1/2006 |
| JP | 2007-303247 A | 11/2007 |

* cited by examiner

*Primary Examiner* — Khoi Tran
*Assistant Examiner* — Abby Lin
(74) *Attorney, Agent, or Firm* — Sughrue Mion, PLLC

(57) ABSTRACT

Provided is a clutch control device capable of highly precisely controlling an engaging force of a clutch even when a rotation of a motor stops or a rotation speed of the motor rapidly decreases. The clutch control device includes: a unit for determining rapid deceleration state for, based on one of the rotation speed of the motor and a rotation angle of the motor, determining a rapid deceleration state of the motor; and a motor current selection unit for, when presence of the rapid deceleration state of the motor is determined, selecting the second motor current detected in each predetermined period as a motor current used for generating the drive signal even when the rotation speed of the motor is equal to or more than the predetermined rotation speed.

4 Claims, 12 Drawing Sheets

CLUTCH CONTROL DEVICE

BACKGROUND OF THE INVENTION

1. Field of the Invention

The present invention relates to a clutch control device installed on, for example, a vehicle for controlling an amount of a stroke of a clutch by employing a motor.

2. Description of the Related Art

As a conventional clutch control method, an actuator is installed in a clutch for dry single-plate starting clutch, and the actuator adjusts, by changing an amount of a stroke of the clutch, an engaging force of the clutch as described in Japanese Patent Application Laid-open No. 2002-81472, for example.

The control method according to Japanese Patent Application Laid-open No. 2002-81472 prevents, by preventing an excessive engagement of the clutch even when a vehicle speed increases, a stop of an engine upon sudden braking, a generation of shocks upon acceleration, and the like.

In this way, it is necessary, for preventing the stop of the engine during creeping at low speed, or upon a slow start, to highly precisely control the engaging force of the clutch. Moreover, for a so-called automatic manual transmission provided with a clutch, it is necessary, for preventing generation of a shift shock during a gear shift, to highly precisely control the engaging force of the clutch after once the clutch is disengaged, and a gear position is changed.

For this purpose, when a motor is used as an actuator for changing the amount of the stroke of the clutch, and a mechanism in which a rotation angle of the motor is proportional to the amount of the stroke of the clutch is provided, in order to control the engaging force of the clutch, it is necessary to highly precisely control torque of the motor. Moreover, the motor torque is proportional to a current supplied to the motor, and thus, in order to increase a precision of the control of the motor torque, it is necessary to increase a precision for detecting the motor current.

As a technology for detecting the motor current, in order to restrain influence of current ripples upon detection of the motor current, there is known a technology for detecting the motor current at a predetermined timing according to the rotation angle of the motor as described in Japanese Patent Application Laid-open No. 2006-6037, for example.

A description is now given of an operation for an automatic transmission using a motor as an actuator for changing an amount of a stroke of a clutch from a state in which the clutch is completely disengaged to a state in which the clutch is engaged.

It should be noted that a clutch mechanism to be described has a configuration in which the rotation angle of the motor is proportional to the amount of the stroke of the clutch, and the engaging force of the clutch can be controlled by the torque of the motor. Moreover, there is also provided a mechanism in which, when a power is not applied to the clutch by the motor, the clutch is returned to a released (disengaged) state, and it is thus necessary for engaging the clutch to always supply the power from the motor to the clutch.

First, when the clutch is completely disengaged, the motor is not driven, and the current does not flow through the motor.

Then, in order to engage the clutch, the amount of the stroke of the clutch is changed. The clutch is in the completely released state, and hence, in order to rotate the motor, a predetermined drive voltage pattern is supplied to a drive circuit for the motor. After the drive voltage pattern is supplied to the drive circuit, the motor starts rotating after a certain delay. It is necessary to manage the torque of the motor during a period until the motor starts rotating, but the motor current is detected in synchronism with a rotation of the motor according to a conventional technology for detecting the motor current, and it is thus impossible to detect the motor current when the motor is stopping or the motor is rotating at such extremely low speed that a control device cannot detect. As a result, in this state, the motor torque cannot be managed, and cannot be controlled highly precisely.

In other words, the motor is constructed by a plurality of coils, and it is thus necessary to switch a current-supply phase of the coil for each predetermined cycle of the rotation angle. The coils contain an inductance component, and when the current-supply phase of the coils is switched, a current value saturates as the time elapses after the start of the current supply. Therefore, the conventional motor current detection technology detects a current value with a small variation by detecting the motor current immediately before the current-supply phase is switched. However, the switching of the current-supply phase occurs only when the motor is rotating, and thus, it is not possible to detect the motor current when the motor is stopping.

Then, in a period in which the motor starts rotating and the amount of the stroke of the motor starts changing, the motor is rotating, and hence, based on the motor current detected according to the rotation angle of the motor, the motor torque is highly precisely controlled.

A period of time required for engaging the clutch is a part of a period of time required for a gear shift operation, and thus, in order to carry out the gear shift operation as quickly as possible, it is desired to reach an amount of the clutch stroke at which the clutch engages as quickly as possible. It is therefore necessary to accelerate the motor up to the possible highest rotation speed. Moreover, when there occurs a rapid change in the motor torque upon the engagement of the clutch, a shift shock may occur, and it is thus necessary to highly precisely control the motor torque even in a deceleration period until the clutch starts engaging.

Then, when the clutch once engages, a change in the amount of the clutch stroke decreases, and it is thus necessary to control the engaging force of the clutch according to an operation state. The motor is not rotating when the clutch is engaged, and hence it is not possible to detect the motor current according to the rotation angle of the motor. As a result, the motor torque cannot be controlled, and thus, the engaging force of the clutch cannot be controlled.

The engagement and disengagement of the clutch is required to frequently repeat the above-mentioned operation as quickly as possible. In other words, the motor which changes the amount of the clutch stroke is also required to carry out the operation of transitioning from a stop state to a high rotation speed state, and then stopping as quickly as possible. Moreover, a change in the motor torque is proportional to a magnitude of the torque transmitted by the clutch, and thus, it is necessary, independently of the rotation state of the motor, to stably control the motor torque.

However, when the motor is stopping or rotating at such extremely low speed that the control device cannot detect, the motor current cannot be detected, and therefore there arises a problem that the motor torque, which is proportional to the motor current, cannot be highly precisely controlled.

As a method for highly precisely controlling the motor torque, there is known a vector control in which the motor current or magnetic flux linkage is vectorized as an instantaneous value, and is, as an instantaneous vector of the torque, made coincident with target torque. When the vector control is employed, independently of the rotation state of the motor, it is possible to highly precisely control the motor torque.

However, for the vector control, it is necessary to sample current data at high speed with respect to the period of the change in the rotation angle, resulting in necessity of an expensive device for arithmetic operation.

In order to solve the above-mentioned problems, even in a case where the motor current is sampled at a constant low-speed sampling period, when the motor current with a small variation can be detected, it is conceivable to highly precisely control the motor torque by means of an inexpensive configuration. On this occasion, in a period in which the sampling period of the current data is equal to or more than twice of a switching period of the current-supply phase of the coils, particularly in a period in which the motor is stopping, the motor current is periodically updated, and it is possible to highly precisely detect the motor current when the motor is stopping.

However, in this case, compared with the method in which the motor current is detected immediately before the switching timing of the current-supply phase, the variation in the motor current detected when the motor is rotating is large, and therefore there arises a problem that the precision for detecting the motor current decreases.

As a result, in a conventional clutch control device, when the rotation speed of the motor is equal to or more than a predetermined rotation speed, the motor current is detected according to the switching timing of the current-supply phase of the motor, and when the rotation speed of the motor is less than the predetermined rotation speed, the motor current is detected in each predetermined period.

As a technology for calculating the rotation speed of the motor, there is provided one which calculate the rotation speed of the motor based on a signal provided by a rotation angle sensor of a motor as described in Japanese Patent Application Laid-open No. 2003-264990, for example.

The calculation method according to Japanese Patent Application Laid-open No. 2003-264990, detects an angle signal input at every predetermined rotation angle from a rotation angle sensor, and calculates a value proportional to a reciprocal of a signal interval as the rotation speed of the motor.

However, the conventional clutch control device has the following problems.

In the conventional clutch control device, when the rotation speed of the motor rapidly decreases, the signal interval of the angle signal from the rotation angle sensor increases, and it is not possible to update the present rotation speed of the motor until the next angle signal is input. Moreover, the rotation speed of the motor is proportional to the reciprocal of the signal interval, and hence an infinitely long period of time is necessary for determining that the rotation of the motor is stopping.

As a result, when the rotation of the motor is stops or the rotation speed of the motor rapidly decreases, and even when an actual rotation speed of the motor decreases below the above-mentioned predetermined rotation speed for switching the detection method of the motor current, it is not possible to update the calculated rotation speed of the motor, and it is not possible to switch the motor current.

Therefore, there arises a problem that, when the rotation of the motor stops or the rotation speed of the motor rapidly decreases, the motor current cannot be highly precisely detected, and thus, the motor torque cannot be highly precisely controlled.

SUMMARY OF THE INVENTION

The present invention has been made to solve the above-mentioned problems, and it is an object of the present invention to provide a clutch control device capable of, with an inexpensive configuration, highly precisely controlling motor torque upon engaging a clutch even when a rotation of a motor stops or a rotation speed of the motor rapidly decreases, thereby being capable of highly precisely controlling an engaging force of the clutch.

A clutch control device according to the present invention includes a motor driven by a drive signal as an actuator for a clutch for engaging and disengaging a power transmitted from a prime mover, in which, when a rotation speed of the motor calculated based on a signal from a rotation angle sensor for detecting a rotation angle of the motor is equal to or more than a predetermined rotation speed, the drive signal is generated based on a first motor current detected according to a rotation of the motor, and when the rotation speed of the motor is less than the predetermined rotation speed, the drive signal is generated based on a second motor current detected in each predetermined period, includes: rapid deceleration state determining means for, based on one of the rotation speed of the motor and the rotation angle of the motor, determining a rapid deceleration state of the motor; and motor current selection means for, when presence of the rapid deceleration state of the motor is determined, selecting the second motor current as a motor current used for generating the drive signal even when the rotation speed of the motor is equal to or more than the predetermined rotation speed.

According to the clutch control device of the present invention, the motor current selection means selects, when the rapid deceleration state determining means determines that a rapid deceleration state is present, the second motor current detected in the each predetermined period as the motor current used for generating the drive signal even when the calculated rotation speed of the motor is equal to or more than the predetermined rotation speed.

As a result, it is possible to provide a clutch control device capable of, with an inexpensive configuration, preventing the motor current from being not updating and highly precisely controlling the motor torque upon engaging the clutch even when the rotation of the motor stops or the rotation speed of the motor rapidly decreases, thereby being capable of highly precisely controlling the engaging force of the clutch.

DETAILED DESCRIPTION OF THE PREFERRED EMBODIMENTS

With reference to the accompanying drawings, a description is now given of respective embodiments of the present invention, and like or corresponding components are denoted by like numerals throughout the drawings.

In the following embodiments, a description is given of examples in which a prime mover is an engine, but the prime mover may be a motor or the like. Moreover, a description is given of examples in which a clutch control device is installed on a motor vehicle, but the clutch control device may be installed on other movable body provided with a prime mover.

First Embodiment

Figure 1:
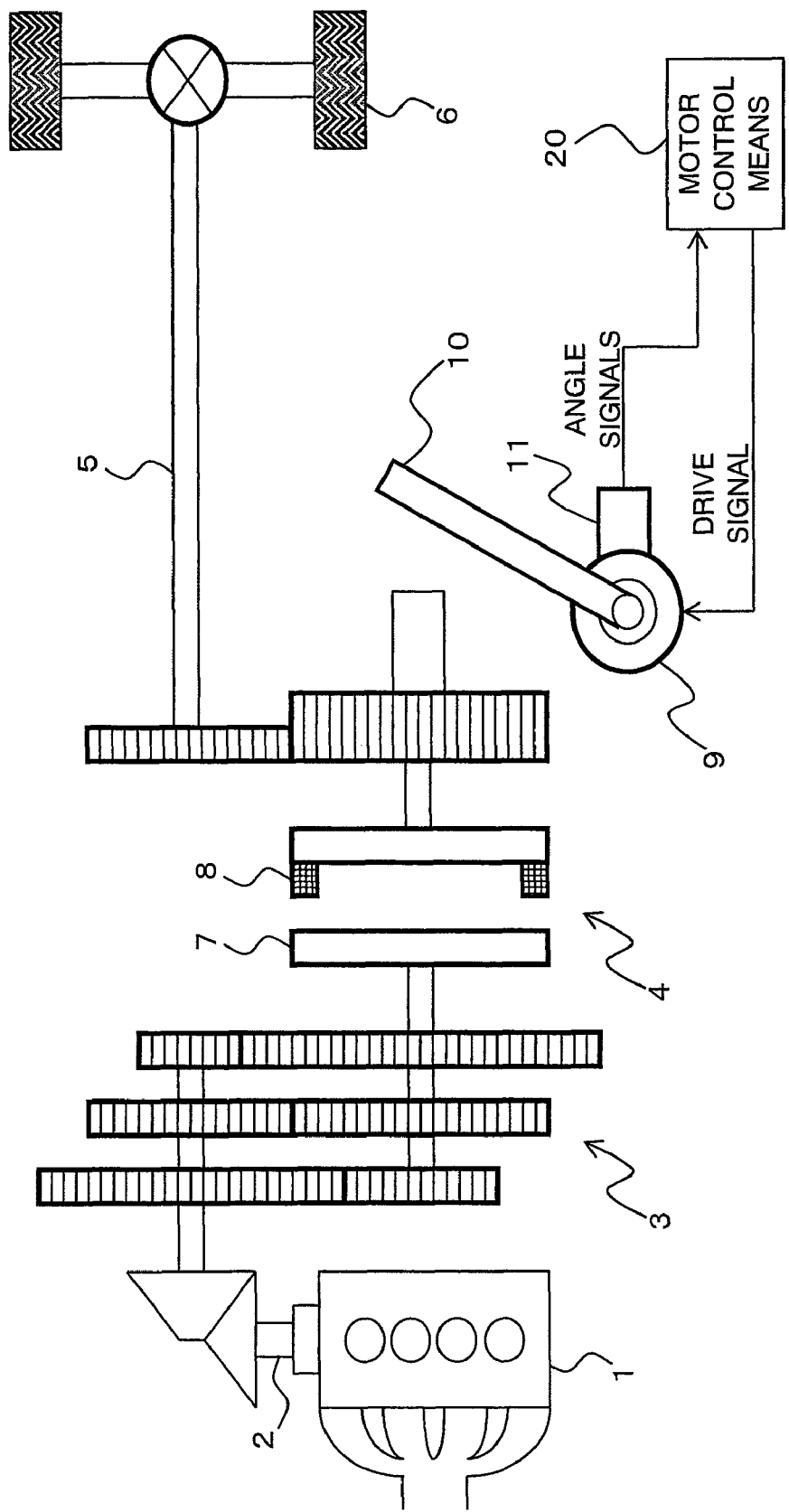
FIG. 1 illustrates a configuration of an entire system including a clutch control device according to a first embodiment of the present invention.

FIG. 1 illustrates a configuration of an entire system including a clutch control device according to a first embodiment of the present invention.

In FIG. 1, to an engine 1, an engine output shaft 2 for outputting a power generated by the engine 1 is connected. To the engine output shaft 2, a transmission mechanism 3 of gear type for changing a gear ratio for transmitting the power of the engine 1 is connected. To the transmission mechanism 3, a clutch 4 for connecting and disconnecting the transmission of the power from the engine 1 is connected. To the clutch 4, via an output shaft 5, tires 6 rotated by the power transmitted from the engine 1 via the clutch 4 are connected.

In the clutch 4, a power transmission mechanism is constructed by a clutch disk 7 which is rotated by the power of the engine 1 transmitted via the transmission mechanism 3, and a friction member 8 which is pressed against the clutch disk 7 for transmitting the power from the engine 1.

Moreover, on the clutch 4, a motor 9 is provided as an actuator for changing an amount of a stroke. To a rotation shaft of the motor 9, a lever 10 is connected, and the clutch 4 is engaged when the motor 9 rotates counterclockwise in FIG. 1, and the lever 10 presses the friction member 8 against the clutch disk 7, thereby allowing the transmission of the power.

To the motor 9, a rotation angle sensor 11 for detecting a rotation angle of the motor 9 to thereby output angle signals, and motor control means 20 for outputting a drive signal to thereby control an operation of the motor 9 are connected. The motor control means 20 generates the drive signal for supplying currents to predetermined current-supply phases of the motor 9 by using the angle signals output from the rotation angle sensor 11.

On this occasion, a strength at which the friction member 8 is pressed against the clutch disk 7 changes according to torque of the motor 9, and thus, a magnitude of torque transmitted from the engine 1 to the tires 6 changes according to the torque of the motor 9. In other words, by controlling an amount of the current supplied to the motor 9, it is possible to control the torque transmitted from the engine 1 to the tires 6.

Figure 2:
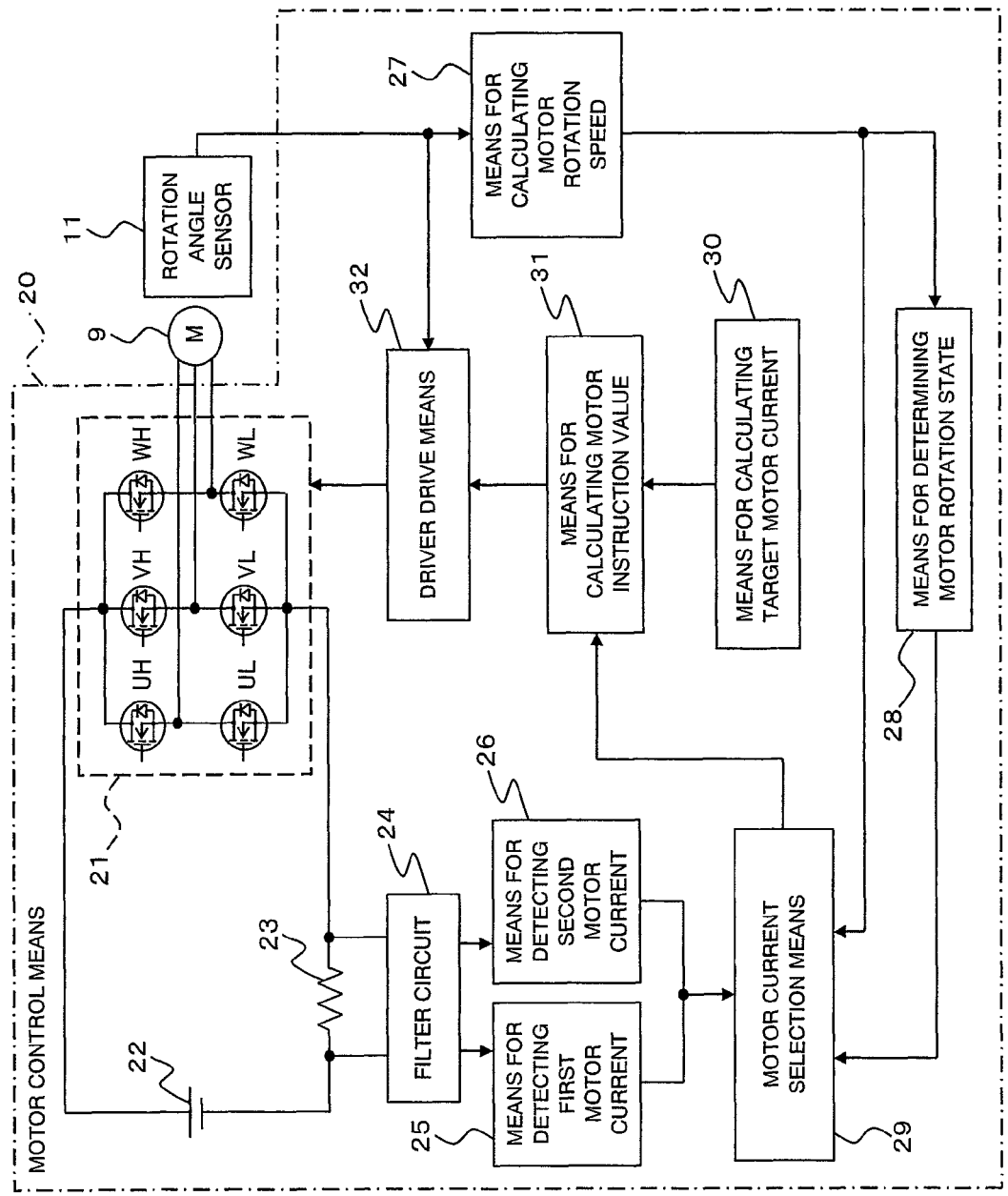
FIG. 2 is a block diagram illustrating motor control means according to the first embodiment of the present invention along with peripheral devices.

FIG. 2 is a block diagram illustrating the motor control means 20 according to the first embodiment of the present invention along with peripheral devices.

In FIG. 2, to the motor control means 20, the motor 9 and the rotation angle sensor 11 are connected. In the first embodiment, a description is given of a case in which the motor 9 is a brushless DC motor.

The motor control means 20 includes a motor drive circuit 21, a battery 22, a shunt resistor 23, a filter circuit 24, means for detecting first motor current 25, means for detecting second motor current 26, means for calculating motor rotation speed 27, means for determining motor rotation state 28 (rapid deceleration state determining means), motor current selection means 29, means for calculating target motor current 30, means for calculating motor instruction value 31, and driver drive means 32.

A description is now given of the respective units of the motor control means 20.

The motor drive circuit 21 outputs the drive signal to the motor 9, to thereby electrically drive the motor 9 using an electric power supplied by the battery 22. In the motor drive circuit 21, six semiconductor switching elements are provided, and three switching elements of UH, VH, and WH are connected to a plus terminal of the battery 22, and three switching elements of UL, VL, and WL are connected to a minus terminal of the battery 22.

Moreover, inside the motor 9, three coils: a U-phase coil, a V-phase coil, and a W-phase coil (not shown) are provided, and are mutually connected to form a star connection. Three terminals of the motor 9 are respectively connected to intermediate positions between the semiconductor switching elements provided between the plus terminal and the minus terminal of the motor drive circuit 21.

The shunt resistor 23 is serially connected within a closed circuit constituted by the motor drive circuit 21 and the battery 22. The shunt resistor 23 has a known resistance, and thus, according to a voltage present across the shunt resistor 23, it is possible to calculate a current flowing through the closed circuit. It should be noted that the voltage across the terminals of the shunt resistor 23 contains switching noises of the motor drive circuit 21 and the like, and the filter circuit 24 is used to remove the noise components.

The means for detecting first motor current 25 detects, according to a switching timing of the current-supply phases of the motor 9, namely according to a rotation of the motor 9, a motor current (first motor current) by means of A/D conversion of the voltage filtered by the filter circuit 24.

The means for detecting second motor current 26 detects a motor current (second motor current) in each predetermined period by means of A/D conversion of the voltage filtered by the filter circuit 24.

The means for calculating motor rotation speed 27 calculates a rotation speed of the motor 9 based on a reciprocal of a change interval period of the angle signals input from the rotation angle sensor 11.

The means for determining motor rotation state 28 determines, based on the rotation speed of the motor 9 calculated by the means for calculating motor rotation speed 27, whether or not the rotation of the motor 9 may stop or the rotation speed of the motor 9 may rapidly decrease (rapid deceleration state of the motor), to thereby output a determination signal.

Specifically, the means for determining motor rotation state 28 first subtracts a present value of the rotation speed of the motor 9 from a previous value of the rotation speed thereof. Then, the means for determining motor rotation state 28 determines, when a value as a result of the subtraction is equal to or more than zero, and the angle signals have not been input from the rotation angle sensor 11 for a predetermined period of time or longer, that the rotation of the motor 9 may stop or the rotation speed thereof may rapidly decrease, and outputs the determination signal. Otherwise, the means for determining motor rotation state 28 determines that there is no fear that the rotation of the motor 9 stops or the rotation speed thereof rapidly decreases, and outputs the determination signal.

The motor current selection means 29 selects, based on the rotation speed of the motor 9 calculated by the means for calculating motor rotation speed 27 and the determination signal supplied by the means for determining motor rotation state 28, any one of the motor current detected by the means for detecting first motor current 25 and the motor current detected by the means for detecting second motor current 26, and outputs the selected motor current as a detected motor current.

Specifically, the motor current selection means 29 outputs, when the rotation speed of the motor 9 calculated by the means for calculating motor rotation speed 27 is equal to or more than a predetermined rotation speed, the motor current detected by the means for detecting first motor current 25. On the other hand, the motor current selection means 29 outputs, when the rotation speed of the motor 9 is less than the predetermined rotation speed, the motor current detected by the means for detecting second motor current 26.

Moreover, the motor current selection means 29 outputs, when the determination signal indicating that the rotation of the motor 9 may stop or the rotation speed thereof may rapidly decrease is input from the means for determining motor rotation state 28, the motor current detected by the means for detecting second motor current 26 even when the motor rotation speed of the motor 9 calculated by the means for calculating motor rotation speed 27 is equal to or more than the predetermined rotation speed.

The means for calculating target motor current 30 calculates, based on information input from gears, a shift lever, and an accelerator pedal (not shown), a target motor current which is a target current for the motor 9.

Specifically, the means for calculating target motor current 30 first calculates, based on the information from the gears, the shift lever, and the acceleration pedal, the torque to be transmitted by the clutch 4. Then, the means for calculating target motor current 30 calculates, based on the torque to be transmitted by the clutch 4, a force of pressing the clutch disk 7 and the friction member 8 against each other. Then, the means for calculating target motor current 30 calculates a target motor current used for generating this pressing force.

The means for calculating motor instruction value 31 carries out a current feedback according to a difference between the target motor current calculated by the means for calculating target motor current 30 and the detected motor current output from the motor current selection means 29, to thereby calculate a motor instruction value which is an instruction value directed to the motor 9.

The driver drive means 32 outputs, based on the motor instruction value calculated by the means for calculating motor instruction value 31 and the angle signals output from the rotation angle sensor 11, a drive instruction to the motor drive circuit 21 in order to change the current-supply phase of and the current supply to the motor 9.

The semiconductor switching elements within the motor drive circuit 21 are driven according to the drive instruction output from the driver drive means 32, to thereby generate a drive signal for causing a predetermined current to flow through specific coils in the motor 9.

Referring to FIGS. 3 to 6, a detailed description is now given of how the current is detected by the means for detecting first motor current 25 and the means for detecting second motor current 26, and how the detected motor current is selected by the motor current selection means 29.

Figure 3:
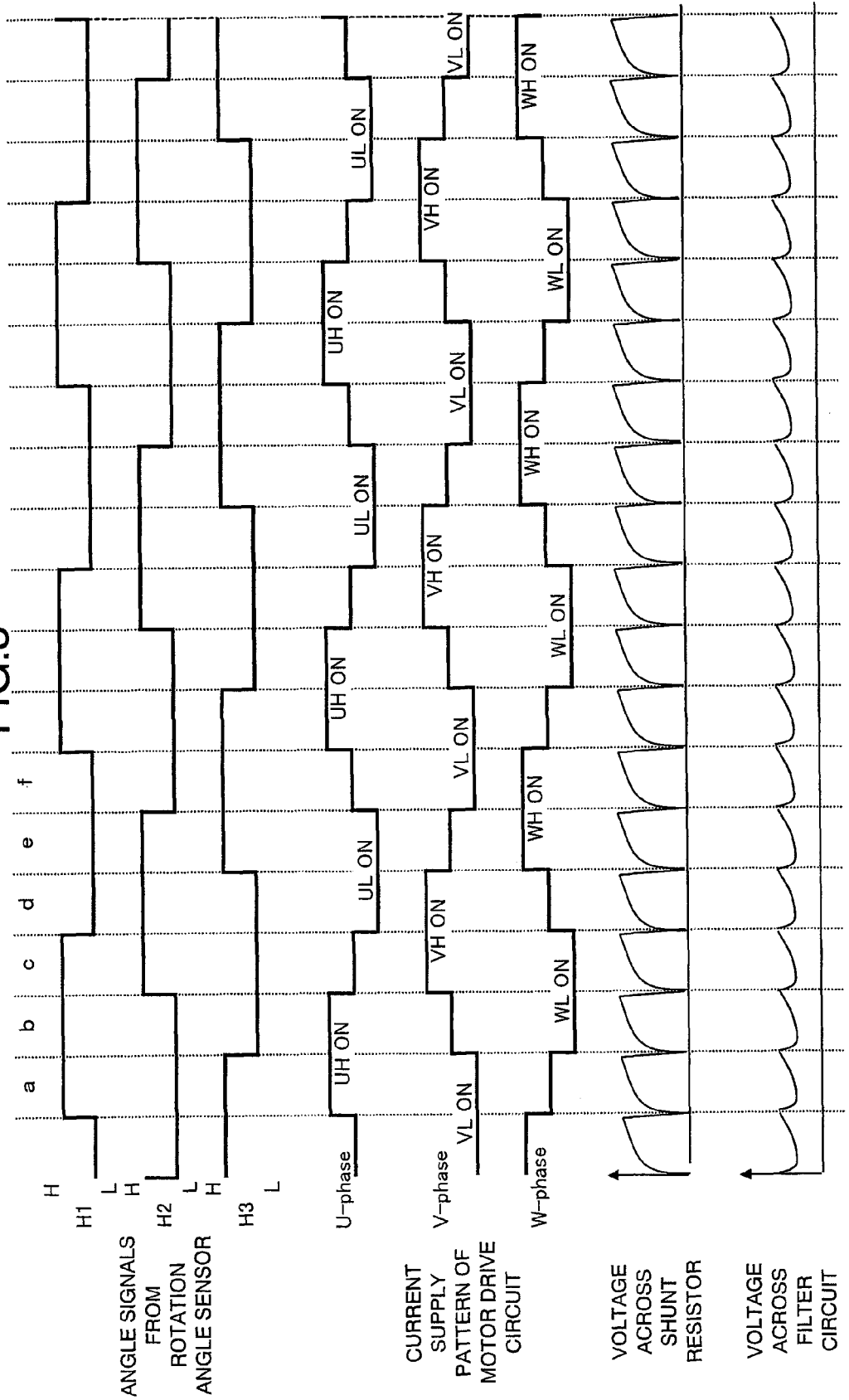
FIG. 3 is a timing chart for describing an operation of the clutch control device according to the first embodiment of the present invention.

FIG. 3 is a timing chart for describing an operation of the clutch control device according to the first embodiment of the present invention.

In FIG. 3, the horizontal axis represents time, and the motor 9, which is a brushless DC motor, rotates at a constant rotation speed.

Moreover, FIG. 3 illustrates a relationship among the angle signals output from the rotation angle sensor 11, current supply patterns of the motor drive circuit 21, the voltage across the shunt resistor 23, and a voltage across the filter circuit 24.

There are three types of rotation angle signals output from the rotation angle sensor 11, and they are respectively denoted by H1, H2, and H3. The signals H1, H2, and H3 are respectively at one of a high level (H) and a low level (L). Based on the combination of those signals, it is possible to obtain a rotation angle of the motor 9. For example, when the signals H1, H2, and H3 are respectively at the H, L, and H levels, it is appreciated that the rotation angle is in a state "a" of FIG. 3, and when the signals H1, H2, and H3 are respectively at the H, L, and L levels, it is appreciated that the rotation angle is in a state "b" of FIG. 3.

For example, when the rotation angle of the motor 9 is in the state "a" of FIG. 3, by causing the current supply pattern of the motor drive circuit 21 to turn on the semiconductor switching elements UH and VL, currents can be supplied to the U-phase coil and the V-phase coil of the motor 9.

The motor drive circuit 21 carries out pulse width modulation, to thereby adjust the voltages applied to the motor 9. As a result, the amount of the current flowing through the coils in the motor 9 can be controlled. On this occasion, output torque of the motor 9 is proportional to the amount of the current flowing through the coils, and thus, the torque output from the output shaft of the motor 9 can be controlled.

The current flowing through the motor 9 is converted into a voltage by the shunt resistor 23 serially connected in the circuit. The voltage present across the shunt resistor 23 contains the switching noises of the semiconductor switching elements and the like, and is thus smoothed by the filter circuit 24.

Moreover, generally, the coils in the motor 9 contain an inductance component, and, when the current-supply phase of the coils is changed by the motor drive circuit 21, the current presents a first-order delay characteristic with respect to the voltage.

Figure 4:
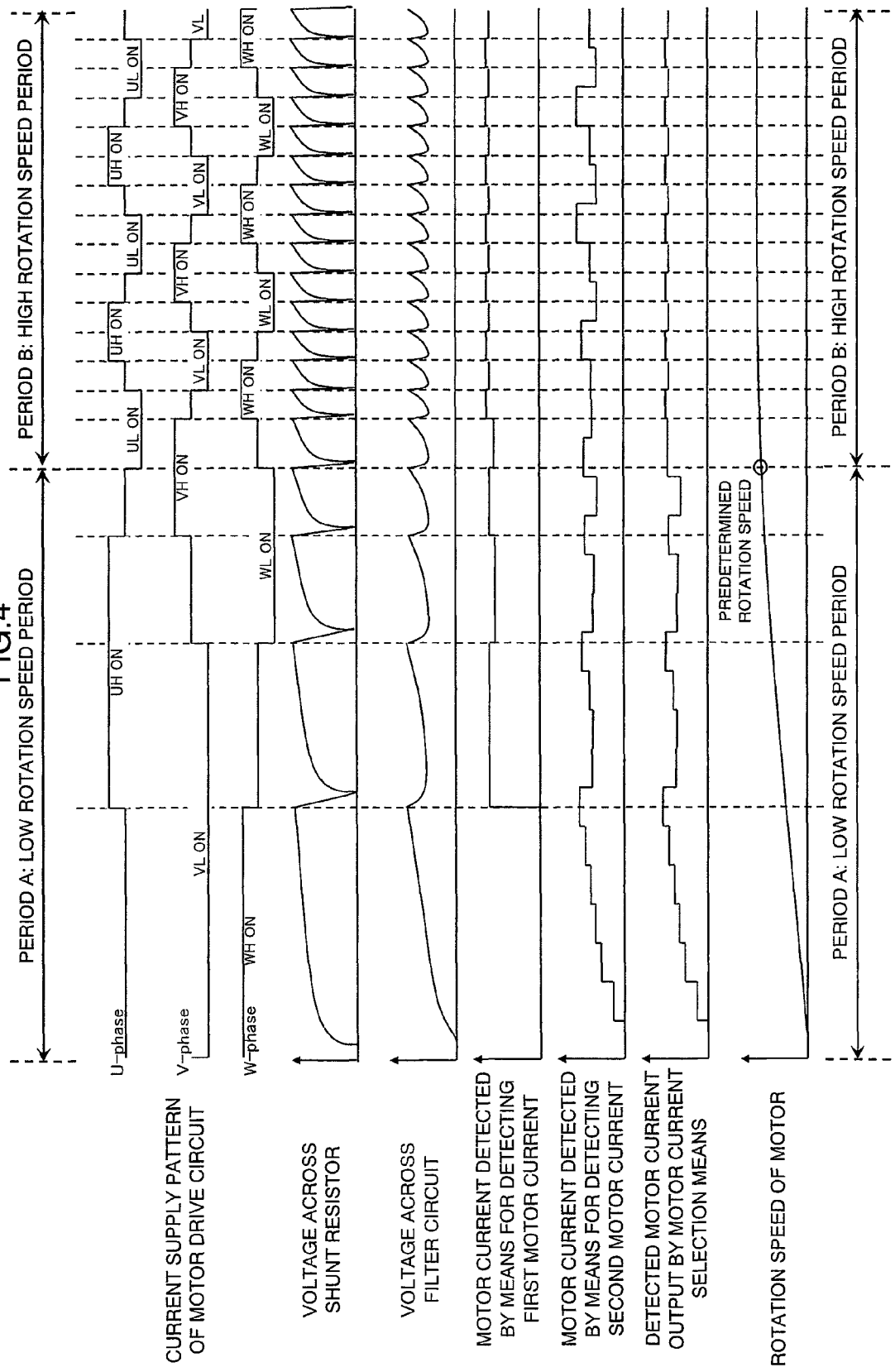
FIG. 4 is another timing chart for describing the operation of the clutch control device according to the first embodiment of the present invention.

FIG. 4 is another timing chart for describing the operation of the clutch control device according to the first embodiment of the present invention.

In FIG. 4, the horizontal axis represents time, and the motor 9, which is a brushless DC motor, rotates at a gradually increasing rotation speed from a state in which the rotation thereof is stopping.

FIG. 4 illustrates relationships among the current supply pattern of the motor drive circuit 21, the voltage across the shunt resistor 23, the voltage across the filter circuit 24, the motor current detected by the means for detecting first motor current 25, the motor current detected by the means for detecting second motor current 26, the detected motor current output by the motor current selection means 29, and the rotation speed of the motor 9.

It should be noted that a period in which the rotation speed of the motor 9 is from 0 rpm to less than the predetermined rotation speed is denoted by period A, and a period in which the rotation speed of the motor 9 is equal to or more than the predetermined rotation speed is denoted by period B.

In the period A, the rotation speed of the motor 9 is lower than that in the period B, and hence the frequency of updating the angle signals output from the rotation angle sensor 11 is low, and thus, the frequency of switching the current-supply phase of the motor 9 is low. The means for detecting first motor current 25 detects the motor current according to the switching timing of the current-supply phase of the motor 9, and hence in the period A, the update frequency of the motor current is low. On the other hand, the means for detecting second motor current 26 detects the motor current in the each predetermined period, and hence the means for detecting second motor current 26 updates the motor current more frequently than the means for detecting first motor current 25 does, and the detected motor current has a waveform close to that of the voltage across the filter circuit 24.

On the other hand, in the period B, the rotation speed of the motor 9 is higher than that in the period A, the update period of the angle signals output from the rotation angle sensor 11 is shorter than the detection period of the motor current carried out by the means for detecting second motor current 26. As a result, the means for detecting first motor current 25 updates the motor current more frequently than the means for detecting second motor current 26 does.

Moreover, the means for detecting first motor current 25 detects the motor current immediately before a timing for switching the current-supply phase, and hence the motor current can be detected in the period in which the behavior of the current is stable. On the other hand, the detection period of the means for detecting second motor current 26 is longer than the period for switching the current-supply phase of the motor 9 in the period B, and hence the detected motor current presents larger fluctuations than the waveform of the voltage across the filter circuit 24.

In this way, in the period A in which the rotation speed of the motor 9 is less than the predetermined rotation speed, the motor current selection means 29 outputs the motor current detected by the means for detecting second motor current 26, and in the period B in which the rotation speed of the motor 9 is equal to or more than the predetermined rotation speed, the motor current selection means 29 outputs the motor current detected by the means for detecting first motor current 25.

As a result, it is possible to obtain a motor current with a small variation independently of the rotation speed of the motor 9, resulting in highly precise control of the torque of the motor 9 with an inexpensive configuration.

Figure 5:
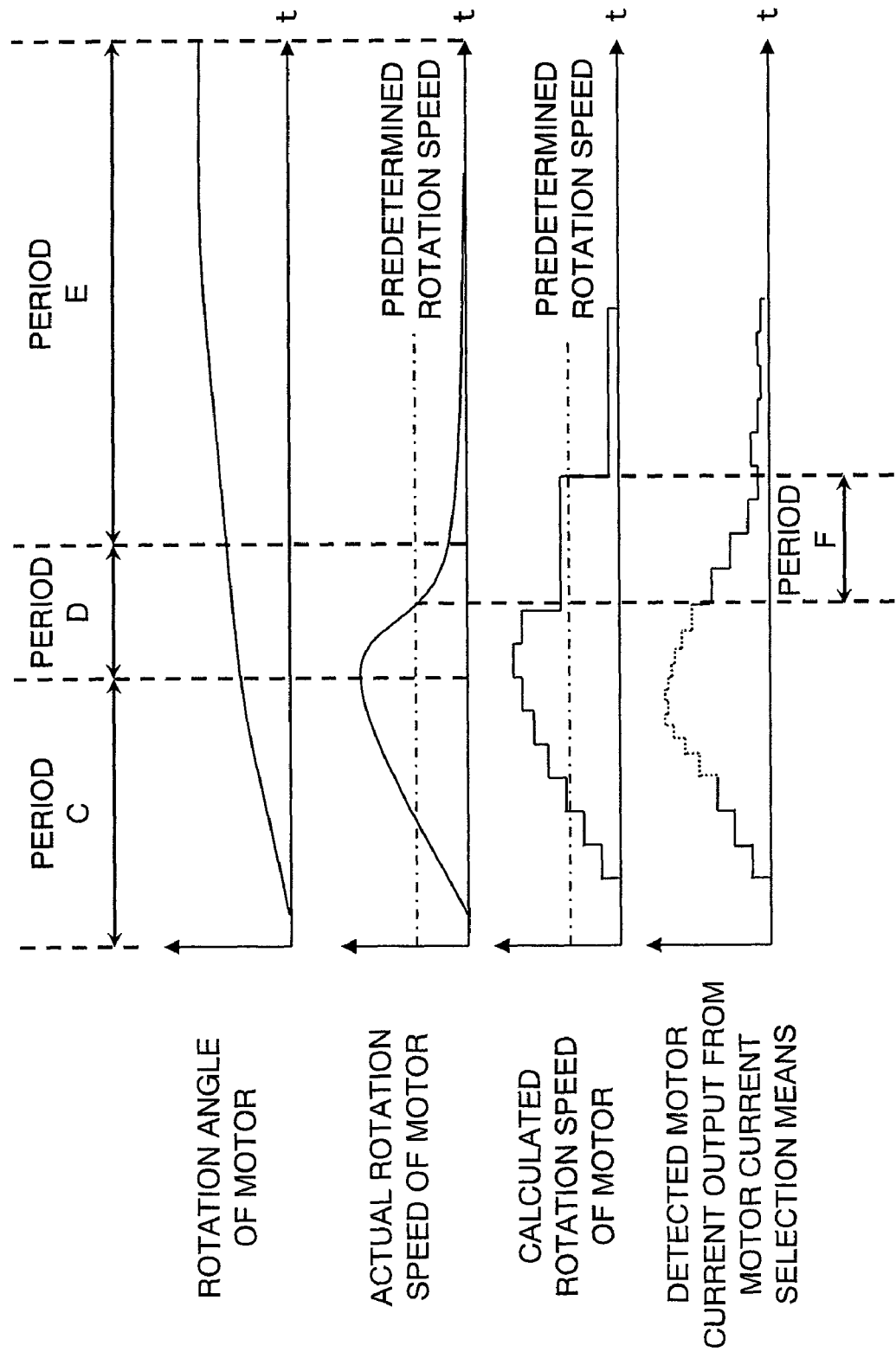
FIG. 5 is still another timing chart for describing the operation of the clutch control device according to the first embodiment of the present invention.

FIG. 5 is still another timing chart for describing the operation of the clutch control device according to the first embodiment of the present invention.

In FIG. 5, the horizontal axis represents time, and the motor 9, which is a brushless DC motor, rotates from a completely released state to a completely engaged state of the clutch 4.

Moreover, FIG. 5 illustrates relationships among the rotation angle of the motor 9, an actual rotation speed of the motor 9, the rotation speed of the motor 9 calculated by the means for calculating motor rotation speed 27, and the detected motor current output from the motor current selection means 29.

Figure 6:
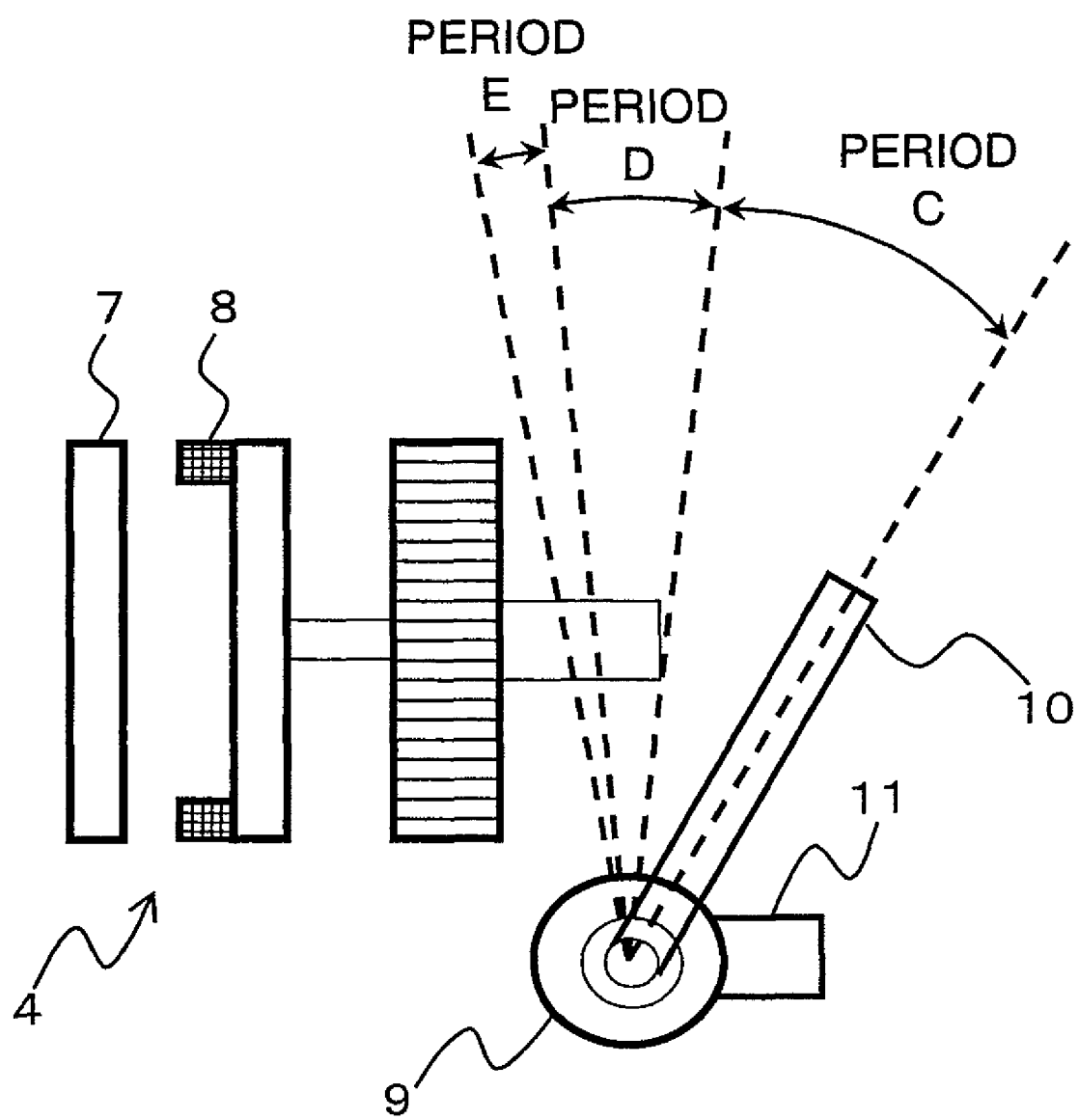
FIG. 6 is an explanatory diagram illustrating a mutual arrangement of a clutch and a motor illustrated in FIG. 1, and a movable range of a lever connected to a rotation shaft of the motor.

Moreover, FIG. 6 is an explanatory diagram illustrating a mutual arrangement of the clutch 4 and the motor 9 illustrated in FIG. 1, and a movable range of the lever 10 connected to the rotation shaft of the motor 9.

In FIGS. 5 and 6, a period C ranges from a time point at which the clutch 4 is initially completely released, to a time point at which the clutch 4 starts engaging. In a period D, the lever 10 and the clutch 4 come into contact with each other, to thereby actually press the friction member 8 against the clutch disk 7. In a period E, the friction member 8 and the clutch disk 7 are completely brought into contact with each other, and the power from the engine 1 is transmitted to the tires 6.

For the operation of the clutch 4, the period C is a dead time, and thus, it is desirable to transition to the period D as soon as possible. In the period D, when the force of the lever 10 for pressing the friction member 8 fluctuates, and the friction member 8 and the clutch disk 7 suddenly come into contact with each other, the torque of the engine 1 is transmitted to the tires 6 abruptly, resulting in decreased drivability. Therefore, in the period D, it is necessary to quickly decrease the rotation speed of the motor 9 which has increased in the period C. In the period E, the motor 9 is pressing the friction member 8 against the clutch disk 7 via the lever 10, and hence the torque of the motor 9 is proportional to the pressing force.

In other words, in the periods D and E, it is necessary to highly precisely control the torque generated by the motor 9.

On this occasion, when the rotation speed of the motor 9 rapidly decreases, a signal interval of the angle signals output from the rotation angle sensor 11 rapidly increases. Therefore, in the period D, even though the actual rotation speed of the motor 9 rapidly decreases, the value of the rotation speed of the motor 9 calculated by the means for calculating motor rotation speed 27 is not updated.

A period F ranges from a time point at which the actual rotation speed of the motor 9 decreases below the predetermined rotation speed, to a time point at which the calculated value of the rotation speed of the motor 9 decreases below the predetermined rotation speed.

In the period F, even though the actual rotation speed of the motor 9 is below the predetermined rotation speed, the detected motor current output from the motor current selection means 29 is the motor current detected by the means for detecting first motor current 25. As a result, the current feedback is not correctly carried out, and thus, the highly precise control of the engaging force of the clutch 4 cannot be carried out.

Thus, the motor current selection means 29 outputs, when the determination signal indicating that the rotation of the motor 9 may stop or the rotation speed thereof may rapidly decrease is input from the means for determining motor rotation state 28, the motor current detected by the means for detecting second motor current 26 even when the calculated rotation speed of the motor 9 is equal to or more than the predetermined rotation speed.

Of the detected motor current output from the motor current selection means 29, dotted lines indicate the motor current detected by the means for detecting first motor current 25, and a solid line indicates the motor current detected by the means for detecting second motor current 26.

As a result of this configuration, even in the period F in which the rotation speed of the motor 9 rapidly decreases, the motor current can be frequently updated, and even when the rotation speed of the motor 9 rapidly decreases or the rotation of the motor 9 stops, it is possible to highly precisely control the torque of the motor 9.

Figure 7:
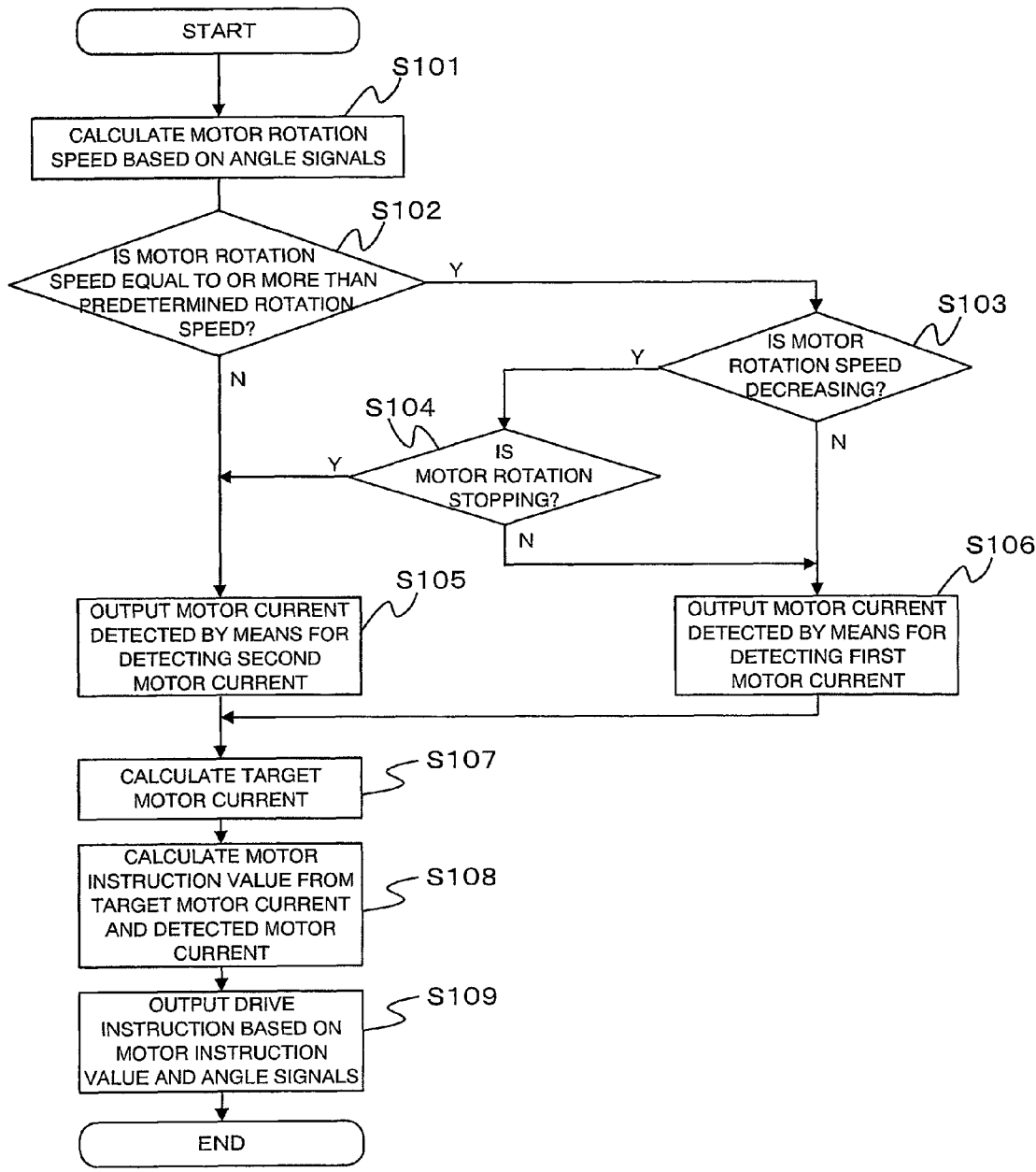
FIG. 7 is a flowchart illustrating an operation of the motor control means according to the first embodiment of the present invention.

Referring to a flowchart of FIG. 7, a description is now given of an operation of the motor control means 20.

First, the means for calculating motor rotation speed 27 calculates the rotation speed of the motor 9 based on the reciprocal of the change interval period of the angle signals input from the rotation angle sensor 11 (Step S101).

Then, the motor current selection means 29 determines whether or not the rotation speed of the motor 9 is equal to or more than the predetermined rotation speed (Step S102).

When the motor current selection means 29 determines that the rotation speed of the motor 9 is equal to or more than the predetermined rotation speed ("YES" in Step S102), the motor current selection means 29 determines whether or not the means for determining motor rotation state 28 determines that the rotation speed of the motor 9 is decreasing (Step S103).

The means for determining motor rotation state 28 determines that the rotation speed of the motor 9 is decreasing when the value as a result of the subtraction of the present value of the rotation speed of the motor 9 from the previous value thereof is equal to or more than zero.

When the motor current selection means 29 determines that the means for determining motor rotation state 28 determines that the rotation speed of the motor 9 is decreasing ("YES" in Step S103), the motor current selection means 29 determines whether or not the means for determining motor rotation state 28 determines that the rotation of the motor 9 is stopping (Step S104).

The means for determining motor rotation state 28 determines that the rotation of the motor 9 is stopping when the angle signals have not been input from the rotation angle sensor 11 for the predetermined period of time or longer.

On the other hand, when the motor current selection means 29 determines that the rotation speed of the motor 9 is not equal to or more than the predetermined rotation speed ("NO" in Step S102), or determines that the rotation of the motor 9 is stopping ("YES" in Step S104), the motor current selection means 29 outputs the motor current detected by the means for detecting second motor current 26 as the detected motor current (Step S105).

When the motor current selection means 29 determines that the rotation speed of the motor 9 is not decreasing ("NO" in Step S103), or determines that the rotation of the motor 9 is not stopping ("NO" in Step S104), the motor current selection means 29 outputs the motor current detected by the means for detecting first motor current 25 as the detected motor current (Step S106).

Then, the means for calculating target motor current 30 calculates, based on the information input from the gears, the shift lever, and the accelerator pedal (not shown), the target motor current which is the target current for the motor 9 (Step S107).

Then, the means for calculating motor instruction value 31 carries out the current feedback according to the difference between the target motor current calculated in Step S107 and the detected motor current output in Step S105 or S106, to thereby calculate the motor instruction value which is the instruction value directed to the motor 9 (Step S108).

Then, the driver drive means 32 outputs, based on the motor instruction value calculated in Step S108 and the angle signals output from the rotation angle sensor 11, the drive instruction to the motor drive circuit 21 in order to change the current-supply phase of and the current supply to the motor 9 (Step S109), and finishes the processing of FIG. 7.

With the clutch control device according to the first embodiment of the present invention, the motor current selection means outputs, when the rotation speed of the motor is equal to or more than the predetermined rotation speed, the motor current detected by the means for detecting first motor current as the detected motor current. On the other hand, the motor current selection means outputs, when the rotation speed of the motor is less than the predetermined rotation speed, the motor current detected by the means for detecting second motor current as the detected motor current.

As a result, it is possible to obtain the motor current with a small fluctuation independently of the rotation speed of the motor, resulting in highly precise control of the torque of the motor with the inexpensive configuration.

Moreover, the motor current selection means outputs, when the determination signal indicating that the rotation of the motor may stop or the rotation speed thereof may rapidly decrease is input from the means for determining motor rotation state, the motor current detected by the means for detecting second motor current even when the calculated rotation speed of the motor is equal to or more than the predetermined rotation speed.

As a result, at the time when the clutch is engaged, even when the rotation of the motor stops or the rotation speed thereof rapidly decreases, it is possible to prevent the motor current from not being updated, and to highly precisely control the torque of the motor by means of the inexpensive configuration, thereby being capable of highly precisely controlling the engaging force of the clutch.

Moreover, the torque of the motor can be optimally controlled according to the operation state, and hence it is possible to reduce the gear shift period, and to reduce the shift shock.

Second Embodiment

Figure 8:
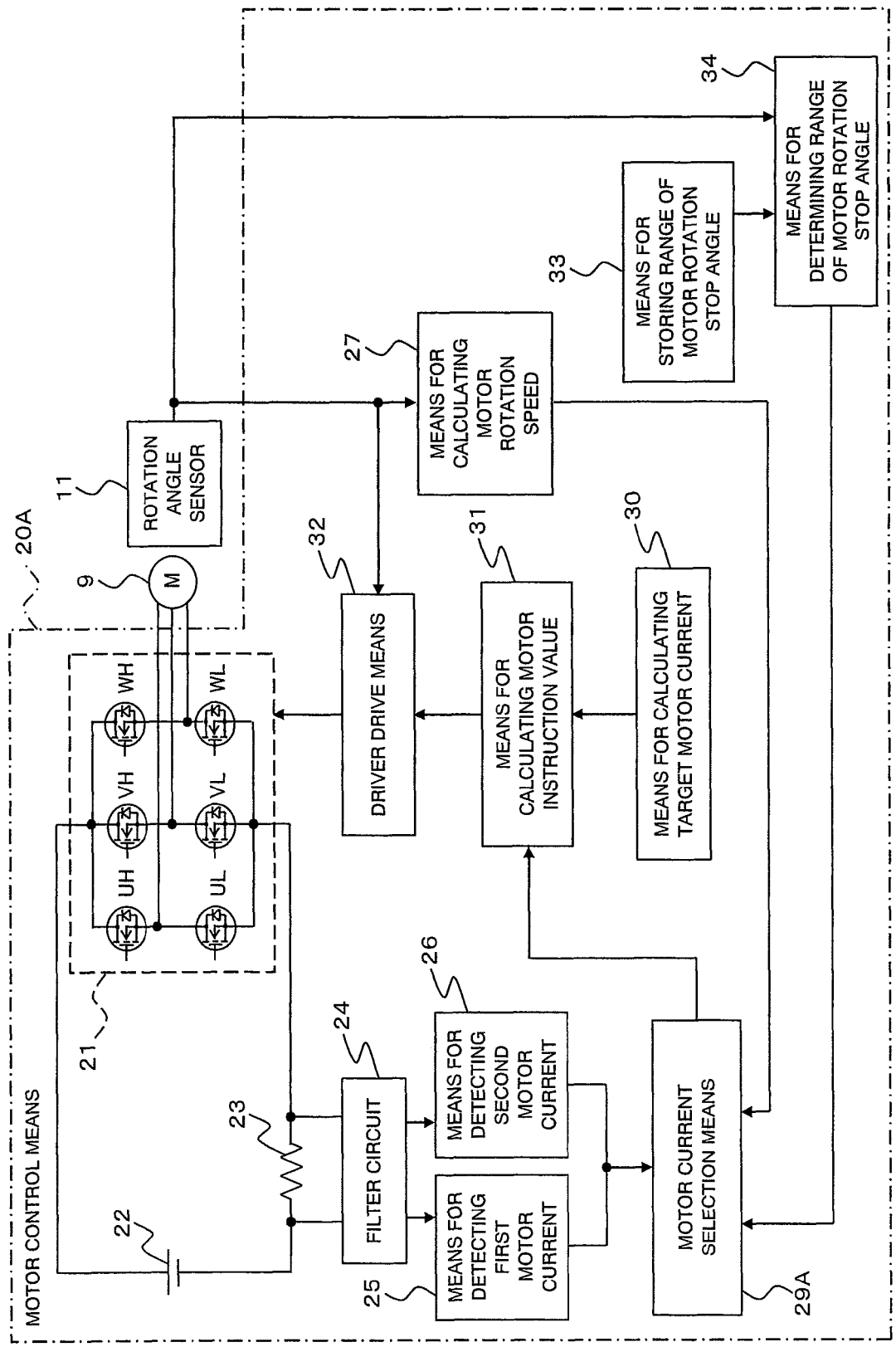
FIG. 8 is a block diagram illustrating motor control means according to a second embodiment of the present invention along with peripheral devices.

FIG. 8 is a block diagram illustrating motor control means 20A according to a second embodiment of the present invention along with peripheral devices.

In FIG. 8, the motor control means 20A includes, in place of the means for determining motor rotation state 28 and the motor current selection means 29 illustrated in FIG. 2, means for storing range of motor rotation stop angle 33 (angle range storage means), means for determining range of motor rotation stop angle 34 (rapid deceleration state determining means), and motor current selection means 29A (rapid deceleration state determining means).

The means for storing range of motor rotation stop angle 33 stores a range of the rotation angle at which the rotation of the motor 9 has stopped before as a stop angle range (predetermined angle range).

The means for determining range of motor rotation stop angle 34 determines, based on the angle signals output from the rotation angle sensor 11, whether or not the rotation angle of the motor 9 is within the stop angle range stored in the means for storing range of motor rotation stop angle 33, and outputs a determination signal.

The motor current selection means 29A selects, based on the rotation speed of the motor 9 calculated by the means for calculating motor rotation speed 27 and the determination signal supplied by the means for determining range of motor rotation stop angle 34, any one of the motor current detected by the means for detecting first motor current 25 and the motor current detected by the means for detecting second motor current 26, and outputs the selected motor current as a detected motor current.

Specifically, the motor current selection means 29A outputs, when the rotation speed of the motor 9 calculated by the means for calculating motor rotation speed 27 is equal to or more than a predetermined rotation speed, the motor current detected by the means for detecting first motor current 25. On the other hand, the motor current selection means 29A outputs, when the rotation speed of the motor 9 is less than the predetermined rotation speed, the motor current detected by the means for detecting second motor current 26.

Moreover, the motor current selection means 29A sets, when the determination signal indicating that the rotation angle of the motor 9 is within the stop angle range stored in the means for storing range of motor rotation stop angle 33 is input from the means for determining range of motor rotation stop angle 34, the predetermined rotation speed used for selecting the motor current to a second predetermined rotation speed (corrected predetermined rotation speed), which is higher than the normal predetermined rotation speed by a predetermined value. Then, the motor current selection means 29A, when the rotation speed of the motor 9 is equal to or more than the second predetermined rotation speed, outputs the motor current detected by the means for detecting first motor current 25, and, when the rotation speed of the motor 9 is less than the second predetermined rotation speed, outputs the motor current detected by the means for detecting second motor current 26.

The other configuration of the second embodiment is similar to that of the first embodiment, and hence description thereof is omitted.

Figure 9:
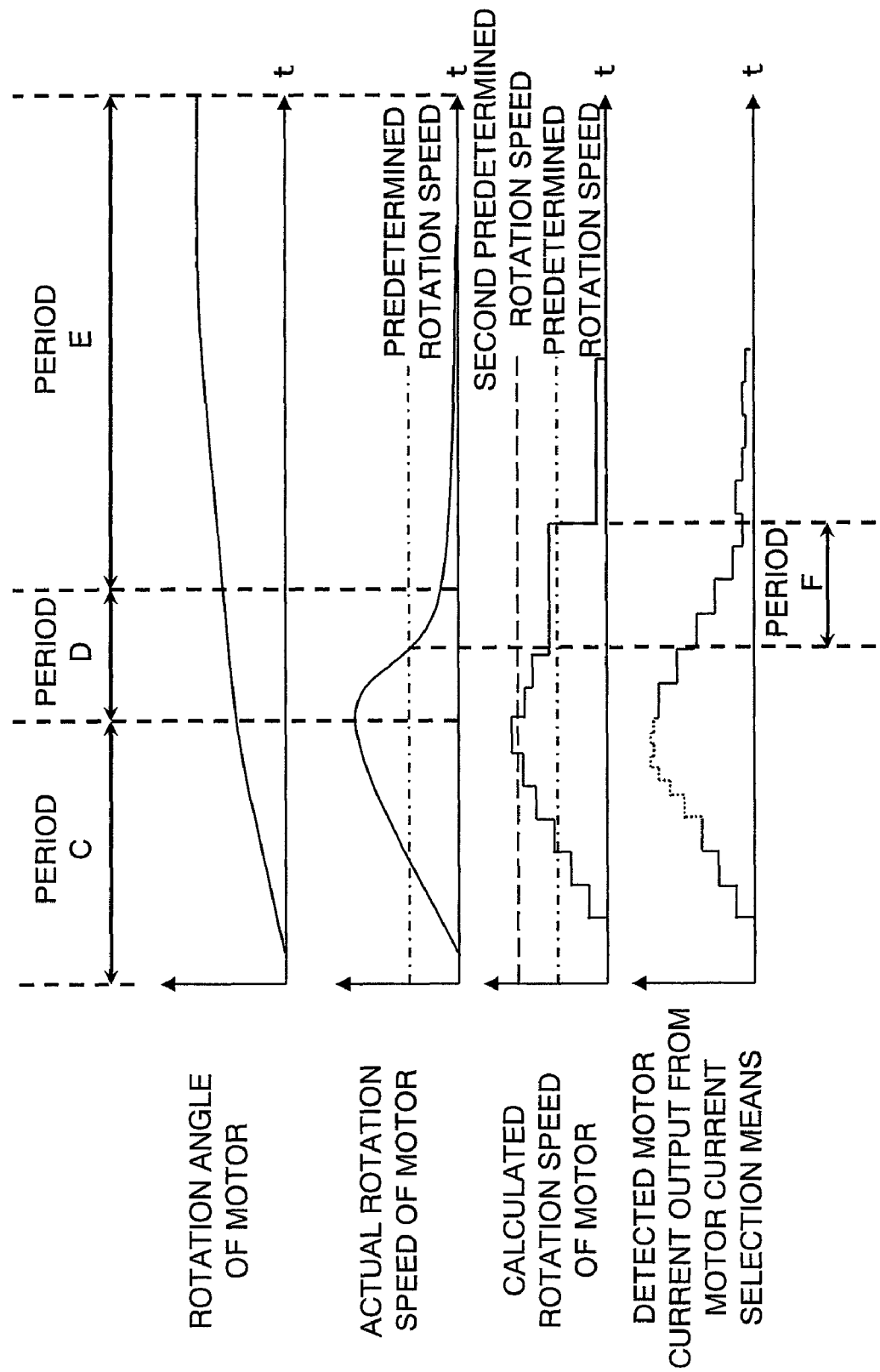
FIG. 9 is a timing chart for describing an operation of a clutch control device according to the second embodiment of the present invention.

FIG. 9 is a timing chart for describing an operation of a clutch control device according to the second embodiment of the present invention.

In FIG. 9, the horizontal axis represents time, and the motor 9, which is a brushless DC motor, rotates from the completely released state to the completely engaged state of the clutch 4.

Moreover, FIG. 9 illustrates relationships among the rotation angle of the motor 9, the actual rotation speed of the motor 9, the rotation speed of the motor 9 calculated by the means for calculating motor rotation speed 27, and the detected motor current output from the motor current selection means 29A.

The periods C to F are the same as those illustrated in FIG. 5, and hence description thereof is omitted.

In the period F, even though the actual rotation speed of the motor 9 is less than the predetermined rotation speed, the detected motor current output from the motor current selection means 29A is the motor current detected by the means for detecting first motor current 25. As a result, the current feedback is not correctly carried out, and thus, the highly precise control of the engaging force of the clutch 4 cannot be carried out.

Thus, the motor current selection means 29A determines, when the determination signal indicating that the rotation angle of the motor 9 is within the stop angle range is input from the means for determining range of motor rotation stop angle 34, that the fear that the rotation of the motor 9 will stop has increased, and thus sets the predetermined rotation speed used for selecting the motor current to the second predetermined rotation speed, which is higher than the normal predetermined rotation speed by the predetermined value. Then, the motor current selection means 29A, when the rotation speed of the motor 9 is equal to or more than the second predetermined rotation speed, outputs the motor current detected by the means for detecting first motor current 25, and, when the rotation speed of the motor 9 is less than the second predetermined rotation speed, outputs the motor current detected by the means for detecting second motor current 26.

Of the detected motor current output from the motor current selection means 29A, dotted lines indicate the motor current detected by the means for detecting first motor current 25, and a solid line indicates the motor current detected by the means for detecting second motor current 26.

As a result of this configuration, even in the period F in which the rotation speed of the motor 9 rapidly decreases, the motor current can be frequently updated, and even when the rotation speed of the motor 9 rapidly decreases or the rotation of the motor 9 stops, it is possible to highly precisely control the torque of the motor 9.

When the rotation of the motor 9 stops, in place of the motor current detected by the means for detecting first motor current 25, the motor current detected by the means for detecting second motor current 26 is instantaneously used for the current feedback, resulting in a reduction of the period in which the motor current is not updated.

Figure 10:
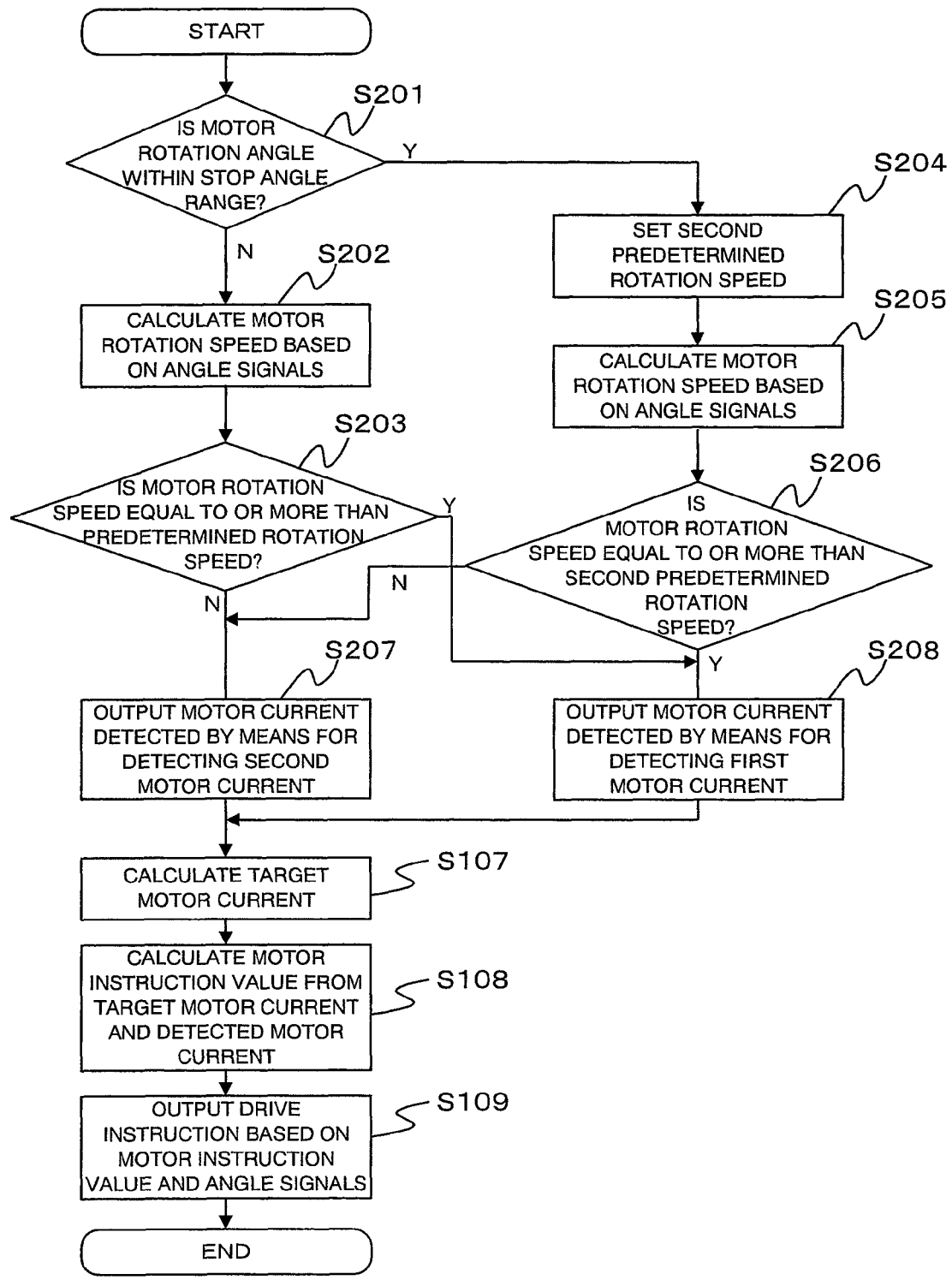
FIG. 10 is a flowchart illustrating an operation of the motor control means according to the second embodiment of the present invention.

Referring to a flowchart of FIG. 10, a description is now given of an operation of the motor control means 20A.

First, the means for determining range of motor rotation stop angle 34 determines whether or not the rotation angle of the motor 9 is within the stop angle range based on the angle signals input from the rotation angle sensor 11 (Step S201).

When the means for determining range of motor rotation stop angle 34 determines that the rotation angle of the motor 9 is not within the stop angle range ("NO" in Step S201), the means for calculating motor rotation speed 27 calculates the rotation speed of the motor 9 based on the reciprocal of the change interval period of the angle signals input from the rotation angle sensor 11 (Step S202).

Then, the motor current selection means 29A determines whether or not the rotation speed of the motor 9 is equal to or more than the predetermined rotation speed (Step S203).

On the other hand, when the means for determining range of motor rotation stop angle 34 determines that the rotation angle of the motor 9 is within the stop angle range ("YES" in Step S201), the motor current selection means 29A sets the second predetermined rotation speed by adding the predetermined value to the predetermined rotation speed (Step S204).

Then, the means for calculating motor rotation speed 27 calculates the rotation speed of the motor 9 based on the reciprocal of the change interval period of the angle signals input from the rotation angle sensor 11 (Step S205).

Then, the motor current selection means 29A determines whether or not the rotation speed of the motor 9 is equal to or more than the second predetermined rotation speed (Step S206).

When the motor current selection means 29A determines that the rotation speed of the motor 9 is not equal to or more than the predetermined rotation speed ("NO" in Step S203), or determines that the rotation speed of the motor 9 is not equal to or more than the second predetermined rotation speed ("NO" in Step S206), the motor current selection means 29A outputs the motor current detected by the means for detecting second motor current 26 as the detected motor current (Step S207).

On the other hand, when the motor current selection means 29A determines that the rotation speed of the motor 9 is equal to or more than the predetermined rotation speed ("YES" in Step S203), or determines that the rotation speed of the motor 9 is equal to or more than the second predetermined rotation speed ("YES" in Step S206), the motor current selection means 29A outputs the motor current detected by the means for detecting first motor current 25 as the detected motor current (Step S208).

A subsequent operation of the second embodiment is similar to that of the first embodiment, and hence description thereof is omitted.

With the clutch control device according to the second embodiment of the present invention, the motor current selection means sets, when the determination signal indicating that the rotation angle of the motor is within the stop angle range is input from the means for determining range of motor rotation stop angle, the predetermined rotation speed used for selecting the motor current to the second predetermined rotation speed. Then, the motor current selection means, when the rotation speed of the motor is equal to or more than the second predetermined rotation speed, outputs the motor current detected by the means for detecting first motor current, and, when the rotation speed of the motor is less than the second predetermined rotation speed, outputs the motor current detected by the means for detecting second motor current.

As a result, at the time when the clutch is engaged, even when the rotation of the motor stops or the rotation speed thereof rapidly decreases, it is possible to prevent the motor current from not being updated, and to highly precisely control the motor torque by means of the inexpensive configuration, thereby being capable of highly precisely controlling the engaging force of the clutch.

Moreover, it is possible to switch the detected motor current without waiting for the determination that the rotation of the motor is stopping, and hence it is possible, when the rotation of the motor stops or the rotation speed of the motor rapidly decreases, to reduce the period in which the motor current is not updated more than the clutch control device according to the first embodiment, resulting in a reduction of the period in which the control precision of the motor torque is decreased.

Moreover, the motor torque can be optimally controlled according to the operation state, and hence it is possible to reduce the gear shift period, and to reduce the shift shock.

Third Embodiment

According to the second embodiment described above, the means for storing range of motor rotation stop angle 33 stores the range of the rotation angle at which the motor 9 has stopped before as the stop angle range.

However, the friction member 8 wears each time the engagement operation of the clutch 4 is repeated, and thus the range of the rotation angle at which the motor 9 stops cannot be the same each time.

A third embodiment describes an operation for updating the stop angle range when it is determined that the rotation of the motor 9 has stopped.

Figure 11:
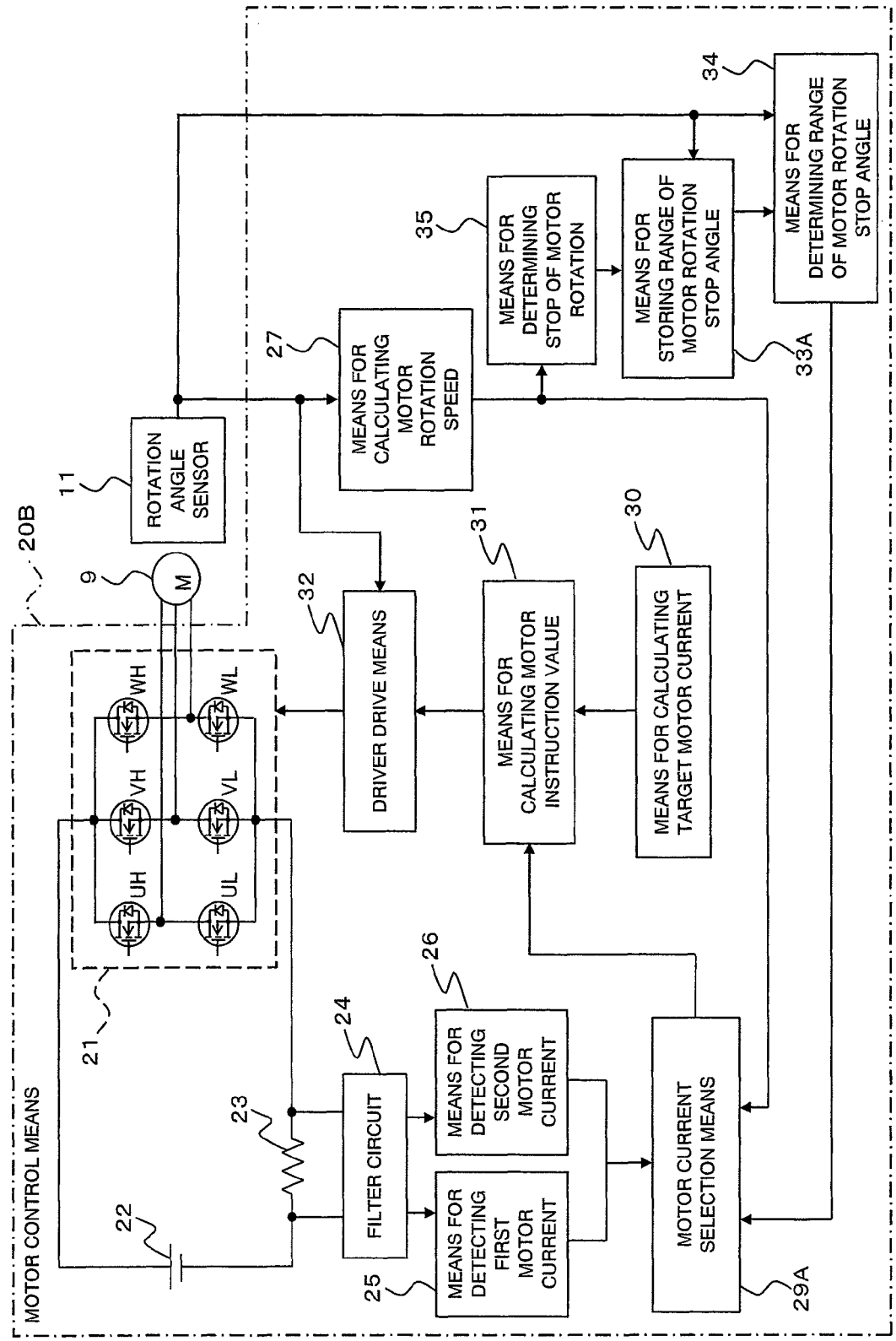
FIG. 11 is a block diagram illustrating motor control means according to a third embodiment of the present invention along with peripheral devices.

FIG. 11 is a block diagram illustrating motor control means 20B according to the third embodiment of the present invention along with peripheral devices.

In FIG. 11, in addition to the motor control means 20A illustrated in FIG. 8, means for determining stop of motor rotation 35 (stop state determining means) is provided. Moreover, the motor control means 20B includes, in place of the means for storing range of motor rotation stop angle 33 illustrated in FIG. 8, means for storing range of motor rotation stop angle 33A (angle range storage means).

The means for determining stop of motor rotation 35 determines, based on the rotation speed of the motor 9 calculated by the means for calculating motor rotation speed 27, whether or not the rotation of the motor 9 has stopped, to thereby output a determination signal.

Specifically, the means for determining stop of motor rotation 35 first subtracts the present value of the rotation speed of the motor 9 from the previous value of the rotation speed thereof, and, when the result of the subtraction is equal to or more than zero, and simultaneously when the angle signals have not been input from the rotation angle sensor 11 for a predetermined period of time or longer, determines that the rotation of the motor 9 has stopped, to thereby output the determination signal.

The means for storing range of motor rotation stop angle 33A stores the range of the rotation angle at which the rotation of the motor 9 has stopped before as the stop angle range (predetermined angle range). Moreover, the means for storing range of motor rotation stop angle 33A updates the stop angle range when the determination signal indicating that the rotation of the motor 9 has stopped is input from the means for determining stop of motor rotation 35, based on the angle signals output from the rotation angle sensor 11 at a time when it is determined that the rotation of the motor 9 has stopped.

As a result of this configuration, even when the friction member 8 has worn, it is possible to highly precisely control the torque of the motor 9 while the rotation of the motor 9 stops or the rotation speed of the motor 9 rapidly decreases.

The other configuration of the third embodiment is similar to that of the second embodiment, and hence description thereof is omitted.

Figure 12:
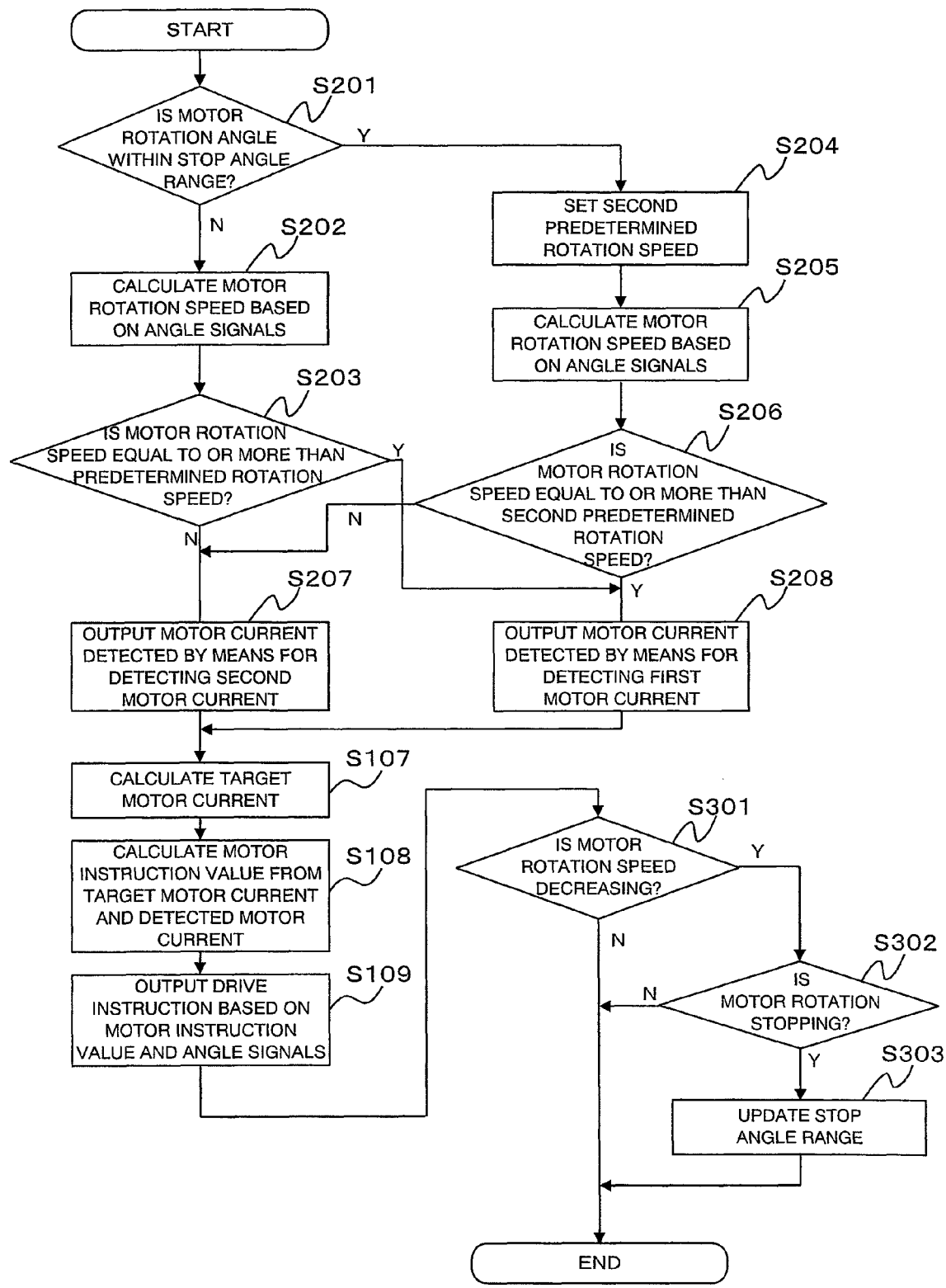
FIG. 12 is a flowchart illustrating an operation of the motor control means according to the third embodiment of the present invention.

Referring to a flowchart of FIG. 12, a description is now given of an operation of the motor control means 20B.

Operations from Steps S201 to S208 and from Steps S107 to S109 are the same as those of the first and second embodiments, and hence description thereof is omitted.

First, the means for determining stop of motor rotation 35 determines, based on the rotation speed of the motor 9 calculated in Step S202 or S205, whether or not the rotation speed of the motor 9 is decreasing (Step S301).

Specifically, the means for determining stop of motor rotation 35 determines that the rotation speed of the motor 9 is decreasing when the value as a result of the subtraction of the present value of the rotation speed of the motor 9 from the previous value thereof is equal to or more than zero.

When the means for determining stop of motor rotation 35 determines that the rotation speed of the motor 9 is decreasing ("YES" in Step S301), the means for determining stop of motor rotation 35 determines whether or not the rotation of the motor 9 is stopping (Step S302).

Specifically, the means for determining stop of motor rotation 35 determines that the rotation of the motor 9 is stopping when the angle signals have not been input from the rotation angle sensor 11 for a predetermined period of time or longer.

When the means for determining stop of motor rotation 35 determines that the rotation of the motor 9 is stopping ("YES" in Step S302), the means for storing range of motor rotation stop angle 33A updates, based on the angle signals output from the rotation angle sensor 11 at the time when it is determined that the rotation of the motor 9 stops, the stop angle range (Step S303), and finishes the processing illustrated in FIG. 12.

Specifically, the means for storing range of motor rotation stop angle 33A stores the rotation angle of the motor 9 at the time when it is determined that the rotation of the motor 9 stops as the stop angle range.

On the other hand, when the means for determining stop of motor rotation 35 determines that the rotation speed of the motor 9 is not decreasing ("NO" in Step S301), and the means for determining stop of motor rotation 35 determines that the rotation of the motor 9 is not stopping ("NO" in Step S302), the means for determining stop of motor rotation 35 finishes the processing illustrated in FIG. 12 without performing further determination.

According to the clutch control device of the third embodiment of the present invention, the means for storing range of motor rotation stop angle updates the stop angle range when the determination signal indicating that the rotation of the motor has stopped is input from the means for determining stop of motor rotation, based on the angle signals output from the rotation angle sensor upon the determination of the stop of the motor.

Therefore, even when the friction member has worn, it is possible, by employing the simple configuration, to highly precisely control the motor torque while the rotation of the motor is stopping or the rotation speed of the motor is rapidly decreasing.

Moreover, it is possible to switch the detected motor current without waiting for the determination that the rotation of the motor has stopped, and hence, when the rotation of the motor stops or the rotation speed of the motor rapidly decreases, it is possible to reduce the period in which the motor current is not updated more than the clutch control device according to the first embodiment, resulting in a reduction of the period in which the control precision of the motor torque is decreased.

Moreover, it is possible to reduce the period in which the motor current output from the means for detecting second motor current, which is less precise, is used as the detected motor current at the time when the motor rotates, and hence it is possible to increase the detection precision of the motor current when the rotation of the motor stops, or the rotation speed of the motor rapidly decreases compared with the clutch control device according to the second embodiment.

Moreover, the motor torque can be optimally controlled according to the operation state, and hence it is possible to reduce the gear shift period, and to reduce the shift shock.

What is claimed is:

1. A clutch control device including a motor driven by a drive signal as an actuator for a clutch for engaging and disengaging a power transmitted from a prime mover, wherein, when a rotation speed of the motor calculated based on a signal from a rotation angle sensor for detecting a rotation angle of the motor is equal to or more than a predetermined rotation speed, the drive signal is generated based on a first motor current detected according to a rotation of the motor, and when the rotation speed of the motor is less than the predetermined rotation speed, the drive signal is generated based on a second motor current detected in each predetermined period, comprising:
    rapid deceleration state determining means for, based on one of the rotation speed of the motor and the rotation angle of the motor, determining a rapid deceleration state of the motor; and
    motor current selection means for, when presence of the rapid deceleration state of the motor is determined, selecting the second motor current as a motor current used for generating the drive signal even when the rotation speed of the motor is equal to or more than the predetermined rotation speed.

2. A clutch control device according to claim 1, wherein the rapid deceleration state determining means determines the rapid deceleration state of the motor based on an amount of a change in the rotation speed of the motor.

3. A clutch control device according to claim 1, wherein the rapid deceleration state determining means compares, when the rotation angle of the motor is within a predetermined angle range stored in angle range storage means as a rotation angle of possibly generating the rapid deceleration state of the motor, the rotation speed of the motor and a corrected predetermined rotation speed higher by a predetermined value than the predetermined rotation speed, and determines, when the rotation speed of the motor is less than the corrected predetermined rotation speed, presence of the rapid deceleration state of the motor.

4. A clutch control device according to claim 3, further comprising stop state determining means for determining a stop state of the motor based on the rotation speed of the motor, wherein the angle range storage means updates, when presence of the stop state of the motor is determined, based on the rotation angle of the motor upon the determination of the presence of the stop state of the motor, the predetermined angle range.

\* \* \* \* \*